United States Patent
Okawa

(10) Patent No.: US 7,420,711 B2
(45) Date of Patent: Sep. 2, 2008

(54) IMAGE READING AND FORMING APPARATUS, CONTROL METHOD, AND PROGRAM WITH SCHEDULING OF CORRECTION PROCESSING BASED ON TIME INTERVAL BETWEEN DOCUMENTS

(75) Inventor: Satoshi Okawa, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 11/271,459

(22) Filed: Nov. 10, 2005

(65) Prior Publication Data

US 2006/0103898 A1    May 18, 2006

(30) Foreign Application Priority Data

Nov. 16, 2004    (JP) ............................. 2004-332373

(51) Int. Cl.
*H04N 1/409* (2006.01)
*H04N 1/12* (2006.01)

(52) U.S. Cl. ..................... 358/3.26; 358/461; 358/463; 358/488; 358/496

(58) Field of Classification Search ............... 358/1.9, 358/3.26, 463, 443, 448, 461, 471, 474, 475, 358/486, 488, 494, 496, 498

See application file for complete search history.

(56) References Cited

U.S. PATENT DOCUMENTS 5,710,634 A * 1/1998 Kuriyama et al. ........... 358/498
6,330,083 B1 * 12/2001 Nabeshima et al. ......... 358/474
2007/0109605 A1 * 5/2007 Shimizu ..................... 358/3.26

FOREIGN PATENT DOCUMENTS

JP    2000-209403 A    7/2000
JP    2002-300394 A    11/2002

* cited by examiner

*Primary Examiner*—Scott A Rogers
(74) *Attorney, Agent, or Firm*—Canon U.S.A., Inc., I.P. Division

(57) ABSTRACT

An image reading apparatus is provided which allows a reading device fixed at a reading position to read images from a document while transporting the document. The apparatus includes a correcting unit adapted to perform correction processing associated with image reading performed by the reading device; a calculating unit adapted to calculate a time interval from one document to the next document that are being transported; a scheduling unit adapted to divide the correction processing into a plurality of steps and schedule the execution of the steps on the basis of the calculated time interval; and an executing unit adapted to sequentially execute the steps scheduled by the scheduling unit every time a document passes through the reading position.

11 Claims, 15 Drawing Sheets

| LIGHT DISTRIBUTION FLUCTUATION CORRECTION PROCESS | STEP 1 |
|---|---|
| | STEP 2 |
| DUST CORRECTION PROCESS | STEP 3 |
| | STEP 4 |
| | STEP 5 |

| | MODE | | |
|---|---|---|---|
| n | SINGLE SIDE max = 3 | DOUBLE SIDE max = 2 | HIGH SPEED DOUBLE SIDE max = 4 |
| 1 | STEPS 1, 2 | STEPS 1 - 4 | STEP 1 |
| 2 | STEPS 3, 4 | STEP 5 | STEP 2 |
| 3 | STEP 5 | — | STEPS 3, 4 |
| 4 | — | — | STEP 5 |

IMAGE READING AND FORMING APPARATUS, CONTROL METHOD, AND PROGRAM WITH SCHEDULING OF CORRECTION PROCESSING BASED ON TIME INTERVAL BETWEEN DOCUMENTS

BACKGROUND OF THE INVENTION

1. Field of the Invention

The present invention relates to an image reading apparatus for reading images from a document, a control method for the image reading apparatus, and a program for having a computer execute the control method.

2. Description of the Related Art

Some known image reading apparatuses with an automatic document feeder (hereinafter "ADF") have a mode called a "skimming mode" that is a reading mode using the ADF. In the skimming mode, an image reading apparatus allows its document reader fixed at a predetermined reading position to read images from a document while allowing its ADF to feed the document at a constant speed.

To maintain the quality of images read from a document, some image reading apparatuses having a skimming mode perform a predetermined operation during intervals between documents being fed. For example, Japanese Patent Laid-Open No. 2002-300394 discloses an image reading apparatus that monitors fluctuations in lamp intensity during intervals between reading individual documents, and adjusts the lamp intensity if the amount of fluctuations in lamp intensity exceeds a certain level.

In another instance, Japanese Patent Laid-Open No. 2000-209403 discloses an image reading apparatus having a skimming mode, which prohibits the execution of correction processing during intervals between reading individual documents if the distance between the document currently passing through a reading position and the subsequent document falls below a certain level.

To read a document with images on both sides, many image reading apparatuses having a skimming mode provide an ADF that allows the document to pass through a reading position three times. Specifically, after the first surface (hereinafter called front side) is read, the document is reversed. Then, after the second surface (hereinafter called back side) is read, the document is reversed again so that all documents are ejected consistently with the same side up (idle reverse ejection).

To increase productivity when a document with images on both sides is read, some image reading apparatuses with the above-described ADF provide a high-speed double-side reading mode in which two documents are transported along a transport path in the ADF. In the high-speed double-side reading mode, after the back side of the previous document is read, the front side of the next document is read simultaneously with the idle reverse ejection of the previous document. That is, the order of a plurality of documents that pass through a reading point is as follows: first document (front side)→first document (back side)→second document (front side)→first document (idle reversal)→second document (back side)→third document (front side)→second document (idle reversal)→third document (back side)→. . . .

However if, as described above, the execution of correction processing during intervals between reading individual documents is prohibited when the distance between the document currently passing through a reading position and the subsequent document falls below a certain level, correction to the subsequent document may not be properly made. In other words, the known image reading apparatuses described above may not be able to produce high-quality read images from documents.

SUMMARY OF THE INVENTION

The present invention provides an image reading apparatus, a control method, and a program (computer readable medium) that allow correction to be performed even if the interval between a document currently being read and the subsequent document is reduced, and are thus capable of preventing the quality of read images from being degraded.

According to a first aspect of the present invention, an image reading apparatus, allowing a reading device fixed at a reading position to read images from a document while transporting the document, includes a correcting unit adapted to perform correction processing associated with image reading performed by the reading device; a calculating unit adapted to calculate a time interval from one document to the next document that are being transported; a scheduling unit adapted to divide the correction processing into a plurality of steps and schedule the execution of the steps on the basis of the time interval calculated by the calculating unit; and an executing unit adapted to sequentially execute the steps scheduled by the scheduling unit every time a document passes through the reading position.

According to a second aspect of the present invention, an image forming apparatus includes the aforementioned image reading apparatus in combination with an image forming unit adapted to form images on a sheet on the basis of images read by the image reading apparatus.

According to a third aspect of the present invention, a control method for an image forming apparatus, allowing a reading device fixed at a reading position to read images from a document while transporting the document, includes performing correction processing associated with image reading performed by the reading device; calculating a time interval from one document to the next document that are being transported during reading in a selected reading mode; dividing the correction processing into a plurality of steps and scheduling the execution of the steps on the basis of the time interval calculated by the calculating step; and sequentially executing the steps scheduled by the scheduling step every time a document passes through the reading position.

According to a fourth aspect of the present invention, a program is provided which causes a computer to execute the aforementioned control. In particular, a computer readable medium is provided which contains computer-executable instructions for an image forming apparatus allowing a reading device fixed at a reading position to read images from a document while transporting the document. The computer readable medium includes computer-executable instructions for performing correction processing associated with image reading performed by the reading device; computer-executable instructions for calculating a time interval from one document to the next document that are being transported during reading in a selected reading mode; computer-executable instructions for dividing the correction processing into a plurality of steps and scheduling the execution of the steps on the basis of the time interval calculated by the calculating step; and computer-executable instructions for sequentially executing the steps scheduled by the scheduling step every time a document passes through the reading position.

Further embodiment, aspects and features of the present invention will become apparent from the following description of exemplary embodiments with reference to the attached drawings.

DESCRIPTION OF THE EMBODIMENTS

Embodiments and various aspects of the present invention will now be described with reference to the drawings.

First Exemplary Embodiment

Figure 1:
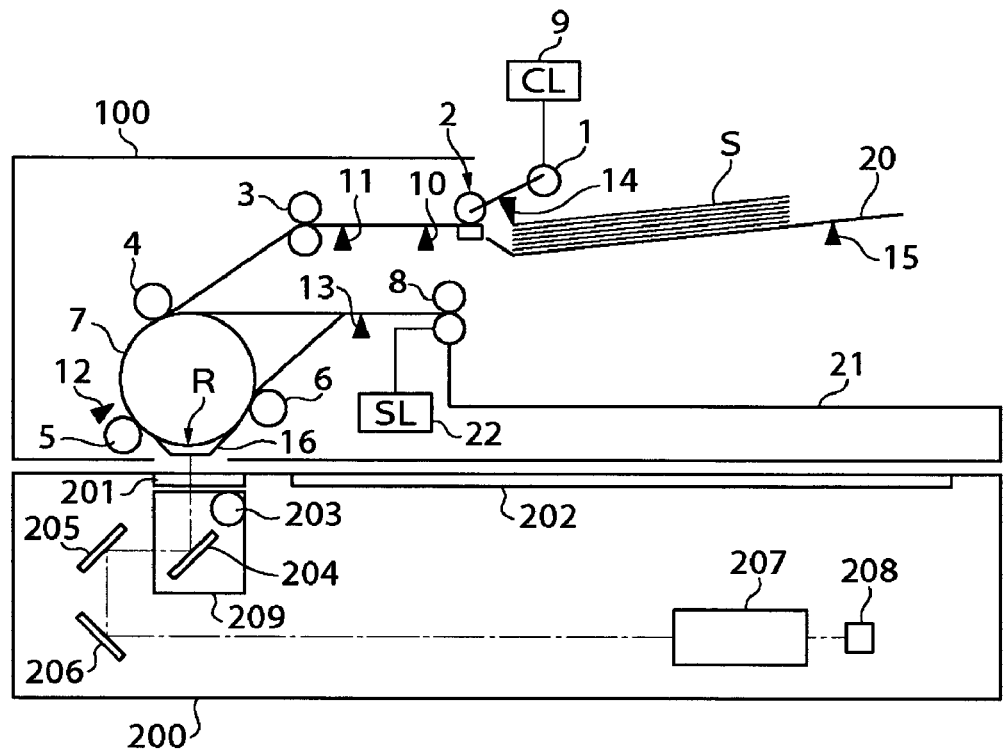
FIG. 1 shows the structure of an exemplary image reading apparatus according to a first embodiment of the present invention.

FIG. 1 shows the structure of an exemplary image reading apparatus according to the first embodiment of the present invention. The image reading apparatus includes an ADF 100 and a reader 200. The ADF 100 includes a document tray 20, a pickup roller 1, a separator 2, a first registration roller 3, a second registration roller 4, a first transport roller 5, a second transport roller 6, a large roller 7, and an ejection roller 8. The reader 200 includes an ADF glass platen (hereinafter "platen") 201, a book platen 202, a lamp 203, a scanner unit 209, mirrors 204-206, a lens 207, and a charge-coupled device (CCD) sensor 208.

The image reading apparatus of the present embodiment provides a plurality of reading modes, including a single-side reading mode, a normal double-side reading mode, and a high-speed double-side reading mode. The single-side reading mode allows the reading of one side of a document transported along a document path of the ADF 100. The normal double-side reading mode allows the reading of both sides of a document transported along the document path of the ADF 100. In the high-speed double-side reading mode, after the back side of the first of two documents transported along the document path of the ADF 100 is read, the front side of the next document is read simultaneously with the idle reverse ejection of the first document.

The ADF 100 is a device that automatically feeds documents. From the top of a batch of documents S placed face up on the document tray 20, the pickup roller 1 driven by a paper feed clutch (CL) 9 sequentially feeds individual documents into the separator 2. Then, the separator 2 having a separation pad and a separation roller thereon with the document path interposed therebetween allows the documents to be transported one by one.

The reader 200 optically reads images from a document, photoelectrically converts reflected light from the document into electric signals, and inputs them as image data. The ADF platen 201 provided is for reading images from a document while the ADF 100 feeds the document. The book platen 202 is provided for reading images from a document placed thereon. For reading images while the ADF 100 feeds a document, the scanner unit 209 is moved to a position under the ADF platen 201 and stopped such that the scanner unit 209 can read images while the document passes through a reading position R. To read images from a document placed on the book platen 202, the scanner unit 209 is moved from a document-set reference position (not shown) in the sub-scanning direction.

For reading images from a document, the lamp 203 of the scanner unit 209 illuminates the document. Reflected light from the document is input into the CCD sensor 208 via mirrors 204 through 206 and a lens 207. Then, the CCD sensor 208 photoelectrically converts the reflected light from the document into electric signals. Image signals are thus outputted.

For reading images from the front side of a document with images on one side (front side), the first registration roller 3 applies skew correction to the document that is being separately transported. Then, the second registration roller 4, the first transport roller 5, and the second transport roller 6 feed the document to the reading position R on a transport guide 16. Images on the front side of the document are read while the document passes through the reading position R. When the trailing end of the document has passed through the reading position R, the document is nipped by the application of a voltage to a solenoid (SL) 22, and transported by the second transport roller 6, and ejected face down onto a paper ejection tray 21.

For reading images from both sides of a document with images on both sides (front side and back side), the first registration roller 3 applies skew correction to the document that is being separately transported. Then, the second registration roller 4, the first transport roller 5, and the second transport roller 6 feed the document to the reading position R on the transport guide 16. Images on the front side of the document are read while the document passes through the reading position R. When the trailing end of the document has passed through the reading position R, the document is nipped by the application of pressure to the solenoid 22 and transported by the second transport roller 6. Then, temporarily, the ejection roller 8 allows the trailing end of the document to move toward the paper ejection tray 21. When a paper ejection sensor 13 detects the trailing end of the document and is turned off, the transport of the document is stopped with the trailing end of the document nipped by the ejection roller 8.

After the switchback transport of the document, the second registration roller 4 applied skew correction to the document again. Then, the solenoid 22 is released and the second registration roller 4, the first transport roller 5, and the second transport roller 6 feed the document to the reading position R. Images on the back side of the document are read while the document passes through the reading position R again.

If the second transport roller 6 and the ejection roller 8 directly eject the document face up onto the paper ejection tray 21, the order of the faces of the document will differ from that of other documents placed on the document tray 20. Therefore, after images on the back side of the document is read, the second transport roller 6 and the ejection roller 8 allow the trailing end of the document to be sent toward the paper ejection tray 21 again.

When the paper ejection sensor 13 detects the trailing end of the document and is turned off, the transport of the document is stopped with the trailing end of the document nipped by the ejection roller 8. After the switchback transport of the document, the second registration roller 4, the first transport roller 5, and the second transport roller 6 feed the document to the ejection roller 8, which then ejects the document face down onto the paper ejection tray 21. Although the document passes through the reading position R during this time period, images on the document are not read.

The image reading apparatus further includes an operating section and a display section (not shown). The user operates the operating section to issue a command for initiating a reading operation to the image reading apparatus, and to determine the settings of the various reading modes (single-side reading mode, normal double-side reading mode, and high-speed double-side reading mode). The display section displays the operating status of the image reading apparatus, warning messages, and the like.

Figure 2:
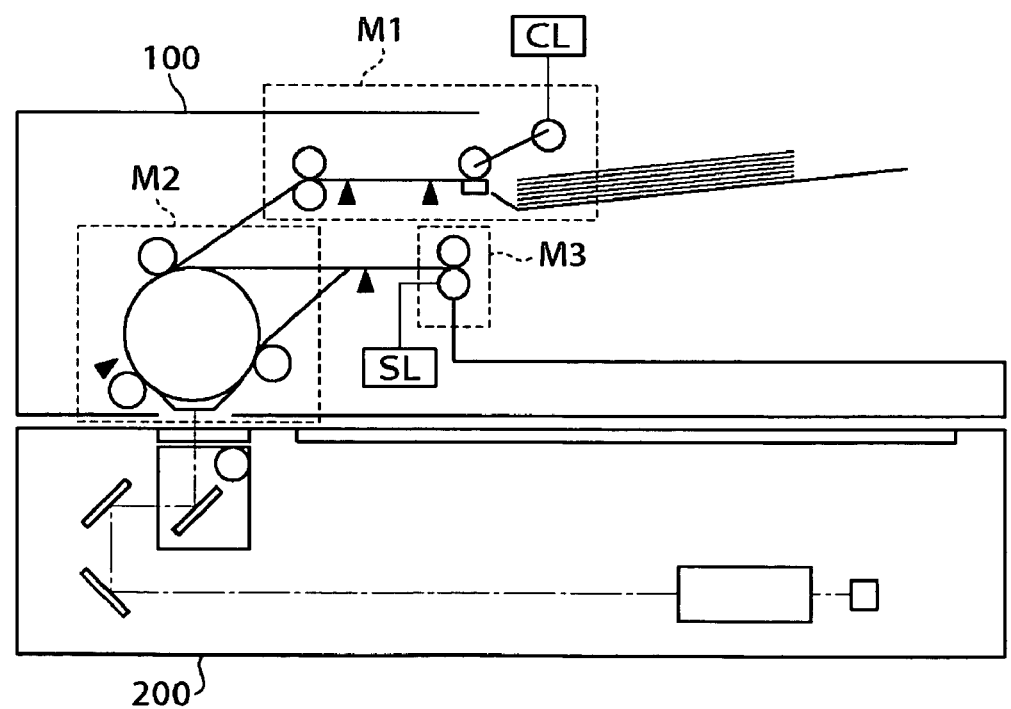
FIG. 2 shows an exemplary drive system for an ADF of the image reading apparatus from FIG. 1.

FIG. 2 shows an exemplary drive system for the ADF 100 of the image reading apparatus. A separation motor M1 drives the separator 2 (see FIG. 1) and the first registration roller 3 (see FIG. 1). A paper feed motor M2 drives the second registration roller 4 (see FIG. 1), the first transport roller 5 (see FIG. 1), and the second transport roller 6 (see FIG. 1). A paper ejection motor M3 drives the ejection roller (see FIG. 1) 8. In FIG. 2, rollers to be driven by the separation motor M1, the paper feed motor M2, and the paper ejection motor M3, respectively, are schematically enclosed by dashed rectangles.

Figure 3:
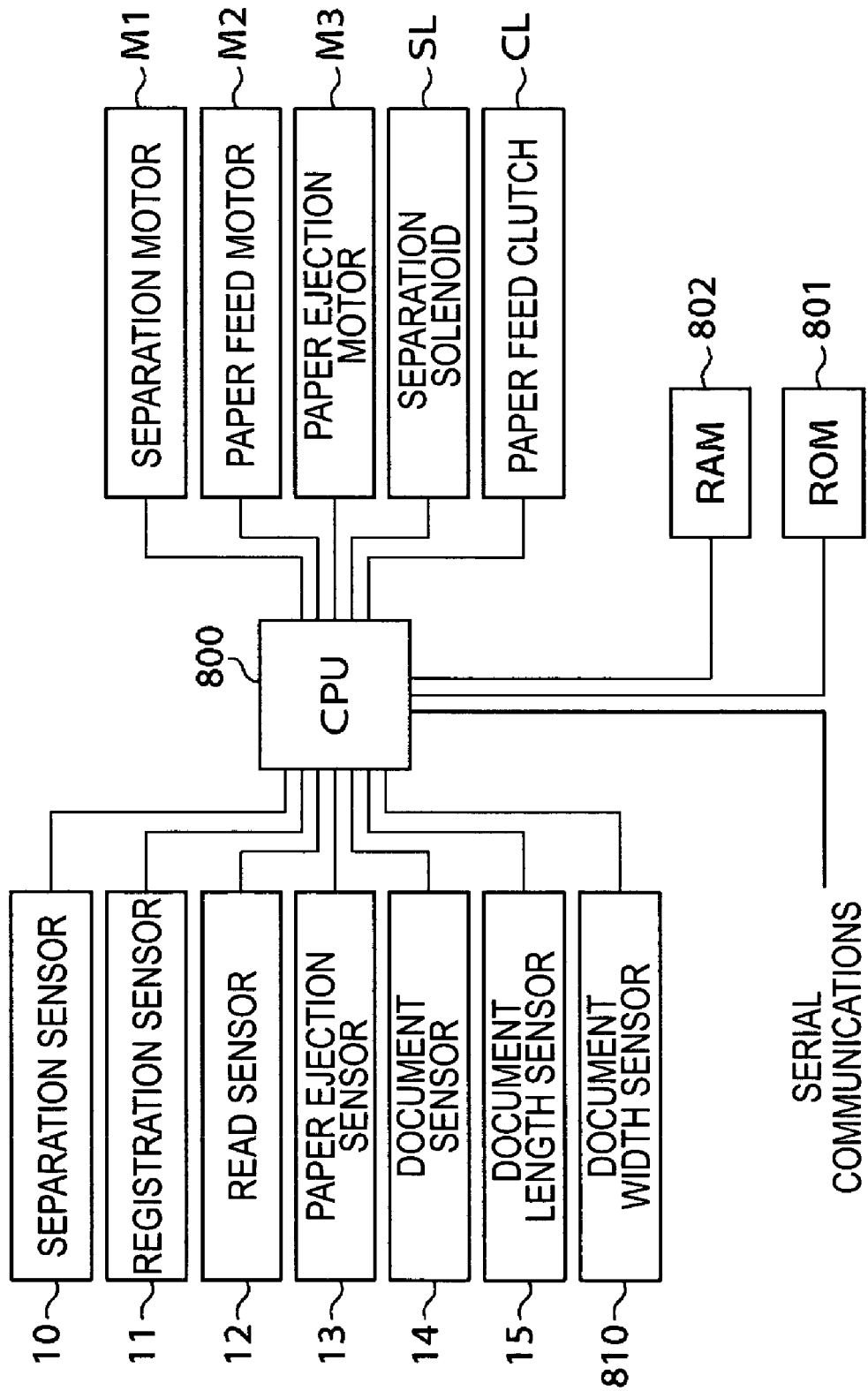
FIG. 3 is a block diagram showing an exemplary architecture of a control system for the ADF.

FIG. 3 is a block diagram showing an exemplary architecture of a control system for the ADF 100 of the image reading apparatus. The ADF 100 includes a central processing unit (CPU) 800, a read-only memory (ROM) 801, a random-access memory (RAM) 802, and output and input ports (not shown).

The CPU 800 controls each part of the ADF 100. According to a control program stored in the ROM 801 connected to the CPU 800 via a bus, the CPU 800 controls the separation motor M1, the paper feed motor M2, the paper ejection motor M3, a separation solenoid SL, and a paper feed clutch CL. At the same time, the CPU 800 performs serial communication with a CPU 1306 (see FIG. 4) of the reader 200 to send and receive control data to and from the reader 200. The control program described above is stored in the ROM 801. Input data and work data is stored in the RAM 802.

The separation motor M1, the paper feed motor M2, the paper ejection motor M3, the separation solenoid SL, and the paper feed clutch CL are connected to output ports of CPU 800. A separation sensor 10 that detects a document separated by the separator 2, a registration sensor 11 that detects a document near the first registration roller 3, and a read sensor 12 that detects a document near the first transport roller 5 are connected to input ports of CPU 800. A paper ejection sensor 13 that detects a document near the ejection roller 8, a document sensor 14 that detects a document on the document tray 20, a document length sensor 15 that detects the length of a document, and a document width sensor 810 (not shown in FIG. 1) that detects the width of a document are also connected to input ports of CPU 800.

Figure 4:
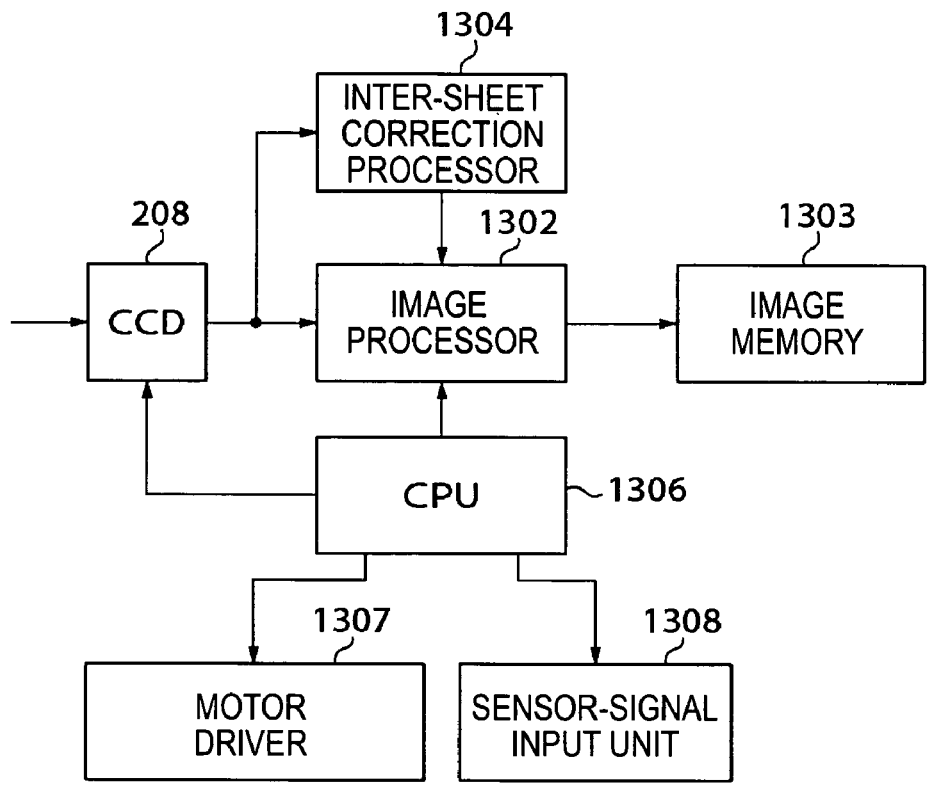
FIG. 4 is a block diagram showing an exemplary architecture of a reader of the image reading apparatus.

FIG. 4 is a block diagram showing an exemplary architecture of the reader 200 of the image reading apparatus. The reader 200 includes an image processor 1302, an image memory 1303, an inter-sheet correction processor 1304, a CPU 1306, a motor driver 1307, and a sensor-signal input unit 1308.

The CPU 1306 controls each part of the reader 200, and is provided with a program storage ROM and work RAM (not shown). The CPU 1306 controls the reader 200 using the motor driver 1307 and the sensor-signal input unit 1308. The motor driver 1307 drives an optical-system drive motor that allows the scanner unit 209 to move in the sub-scanning direction. The sensor-signal input unit 1308 inputs signals outputted from various sensors in the reader 200 into the CPU 1306.

On the basis of time intervals between individual documents being transported during reading in the reading modes described above, and on the basis of time required for correction processing steps, the inter-sheet correction processor 1304 assigns the steps to time units that fall within the time intervals between documents in the reading modes. Then, the inter-sheet correction processor 1304 creates a schedule pattern table (see FIG. 21) for each of the reading modes such that all correction processing steps are executed in one or a plurality of time intervals between documents. The inter-sheet correction processor 1304 then performs inter-sheet correction processing. On the basis of the control program described above, the inter-sheet correction processor 1304 executes processing shown in the flowchart in FIGS. 22 and 23 (first embodiment), and processing shown in the flowchart in FIGS. 24 and 25 (second embodiment).

Image data is stored in the image memory 1303. The image processor 1302 converts image signals, which are formed into images on the CCD sensor 208 via the lens 207 and the like, into digital image data, performs various image processing operations thereon, and writes the digital image data in the image memory 1303.

Figure 5:
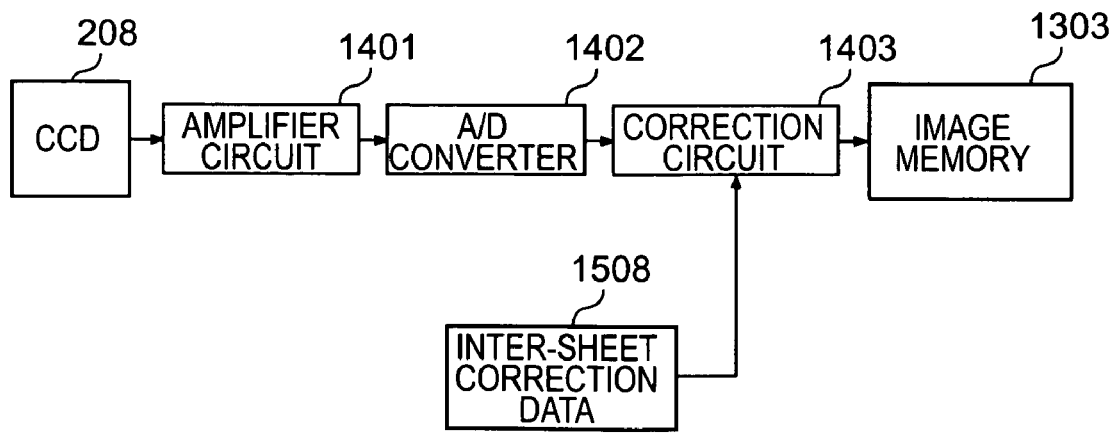
FIG. 5 is a block diagram showing an exemplary architecture of an image processor of the reader.

FIG. 5 is a block diagram showing the structure of the image processor 1302 of the reader 200. The image processor 1302 includes an amplifier circuit 1401, an analog-to-digital (A/D) converter 1402, and a correction circuit 1403.

In the process of scanning images on a document, an analog image signal with respect to each scanning line is output from the CCD sensor 208 and is input to the amplifier circuit 1401. The analog image signal is amplified by the amplifier circuit 1401 and converted into an 8-bit digital image signal by the A/D converter 1402. Furthermore, on the basis of inter-sheet correction data 1508 created in the inter-sheet correction processor 1304, the correction circuit 1403 performs correction processing on the digital image signal. Then, image data is written into the image memory 1303. The processing described above is carried out for all image areas on the document. Images read from the document are thus created.

Next, the overview of operations in high-speed double-side reading mode of the image reading apparatus will now be described with reference to FIGS. 6 to 13, and in particular, when images are read from two documents in high-speed double-side reading mode.

Figure 6:
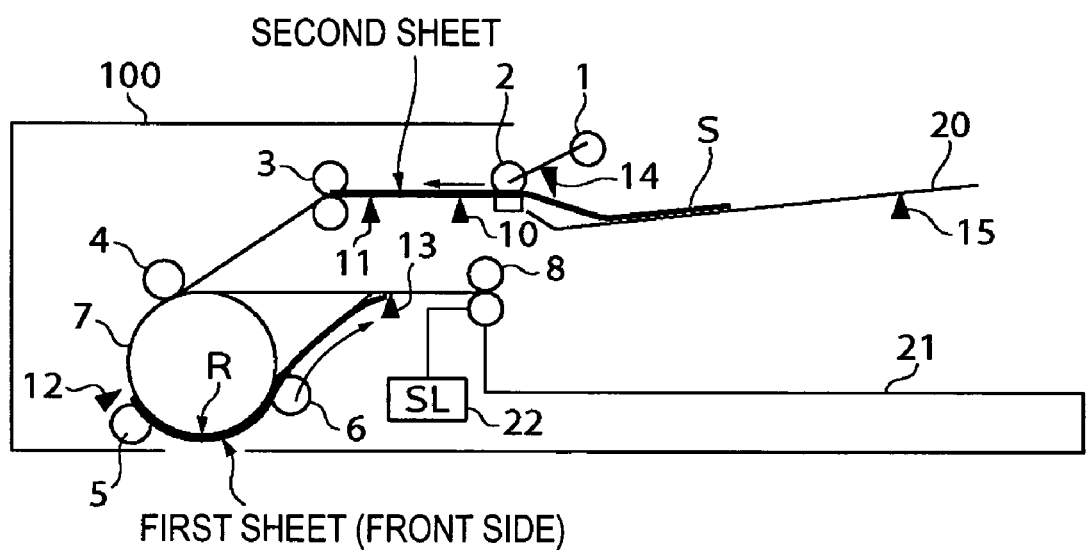
FIG. 6 is a diagram showing a portion of an exemplary operation in high-speed double-side reading mode.

Beginning with FIG. 6, images on the front and back sides of the first document are read. In the image reading for the front side of the first document, when the trailing end of the first document has passed through the read sensor 12, the second document is separated by the separator 2 from a batch of documents S on the document tray 20. After being separated, the second document is placed on standby at the position of the first registration roller 3.

Figure 7:
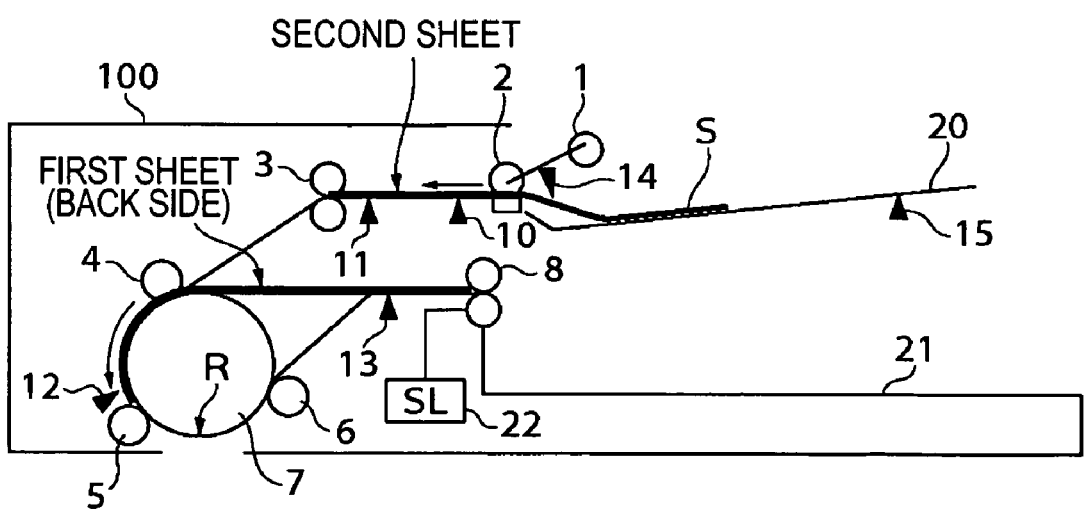
FIG. 7 is a diagram showing another portion of the operation in high-speed double-side reading mode.

As shown in FIG. 7, upon completion of the image reading for the front side of the first document, the switchback transport of the first document is performed along a switchback path, and images on the back side of the first document are read.

Figure 8:
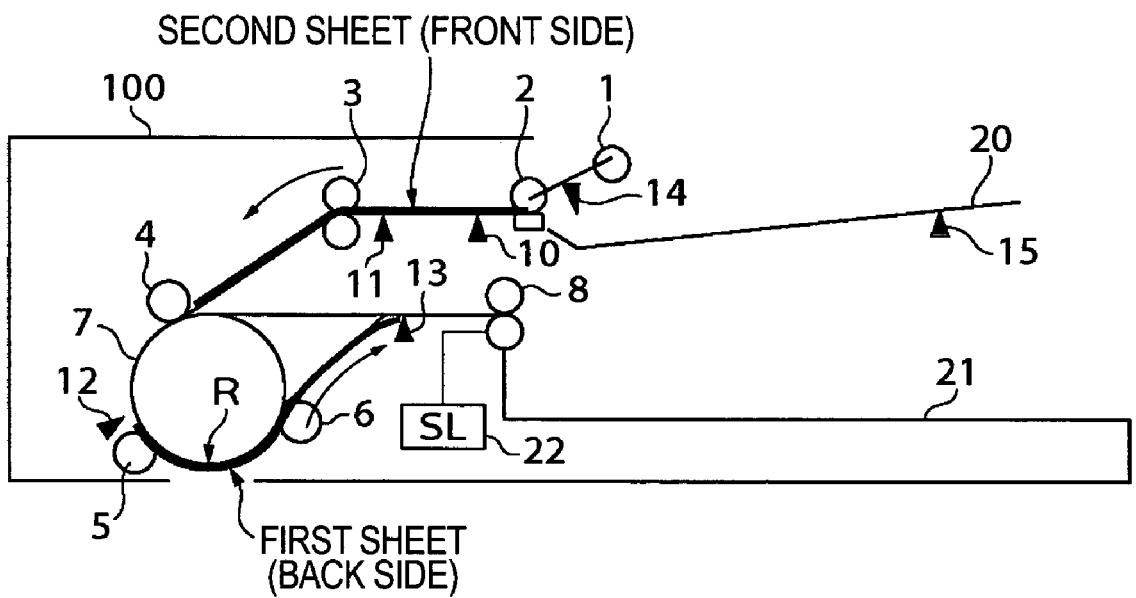
FIG. 8 is a diagram showing still yet another portion of the operation in high-speed double-side reading mode.

As shown in FIG. 8, when a predetermined time period has elapsed after the trailing end of the first document has passed through the second registration roller 4, the feeding of the second document that has been on standby at the position of the first registration roller 3 starts.

Figure 9:
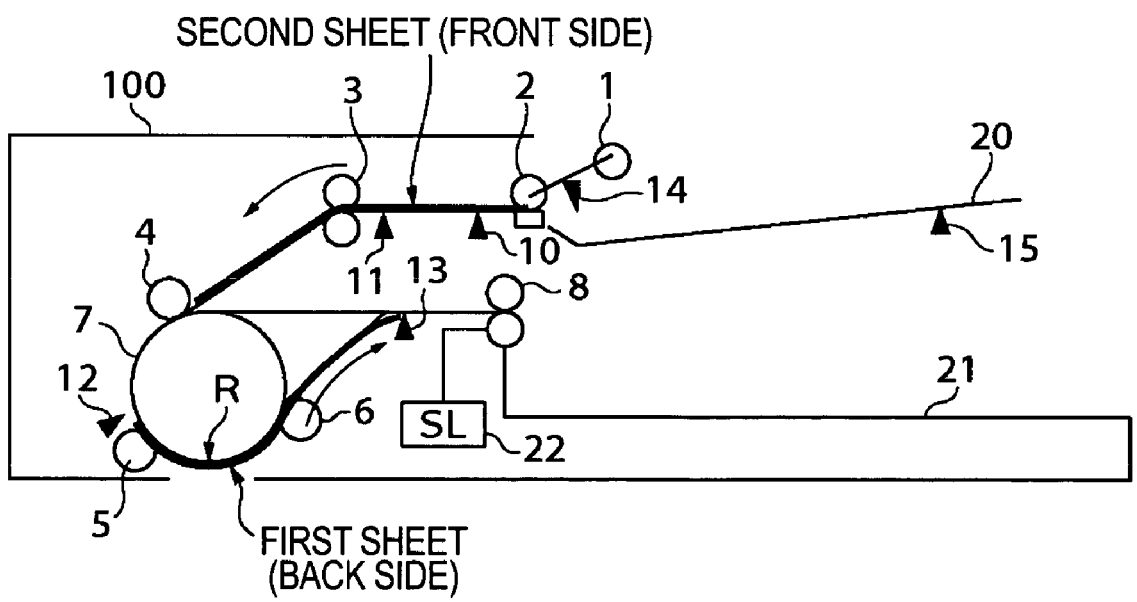
FIG. 9 is a diagram showing another portion of the operation in high-speed double-side reading mode.

Next, as shown in FIG. 9, after images on the back side of the first document are read, a voltage is applied to the solenoid 22 and the ejection roller 8 allows the first document to be transported toward the paper ejection tray 21. At the same time, the second document is transported and the image reading on the front side of the second document starts.

Figure 10:
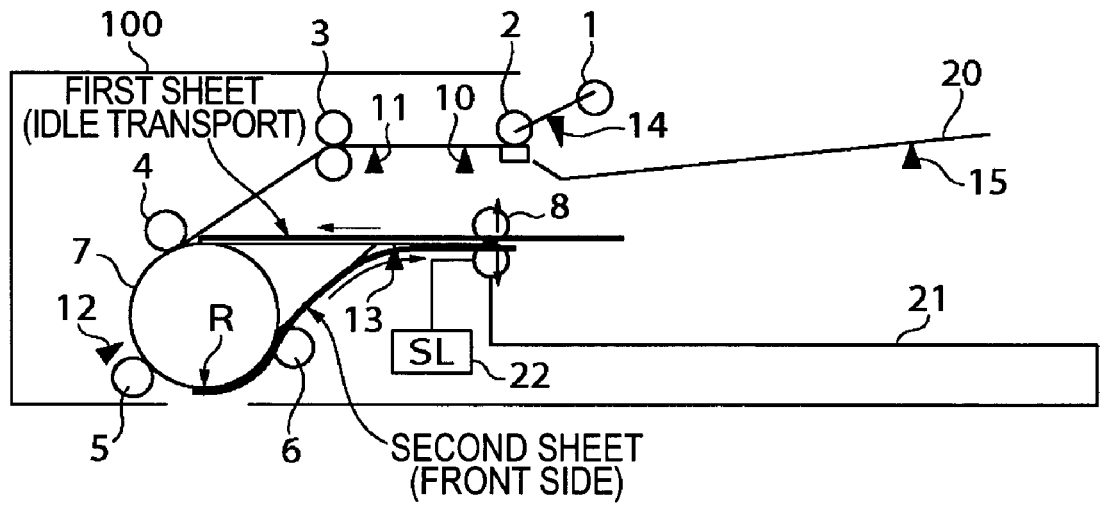
FIG. 10 is a diagram showing still yet another portion of the operation in high-speed double-side reading mode.

Then next, as shown in FIG. 10, for idle transport, the first document is fed to the switchback path through switchback transport. After the image reading on the front side of the second document starts, the solenoid 22 is released by the time the leading end of the second document reaches the ejection roller 8. This is on the condition that the leading end of the first document has passed through the second registration roller 4.

Figure 11:
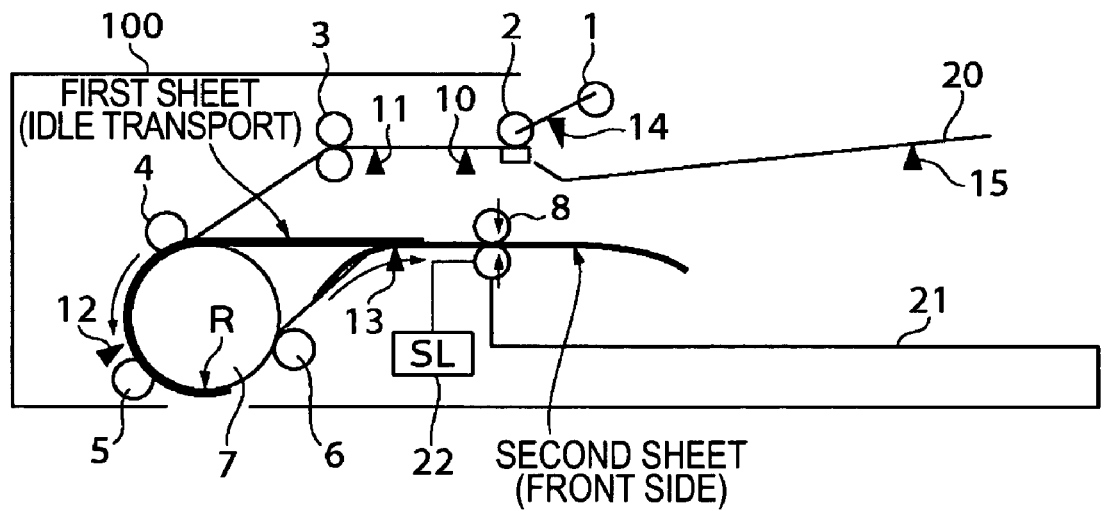
FIG. 11 is a diagram showing another portion of the operation in high-speed double-side reading mode.

As shown in FIG. 11, after images on the front side of the second document are read, a voltage is applied to the solenoid 22 and the ejection roller 8 allows the second document to be transported. The first document is also transported. Although the first document passes through the reading position R, image reading on the first document is not performed at this time.

Figure 12:
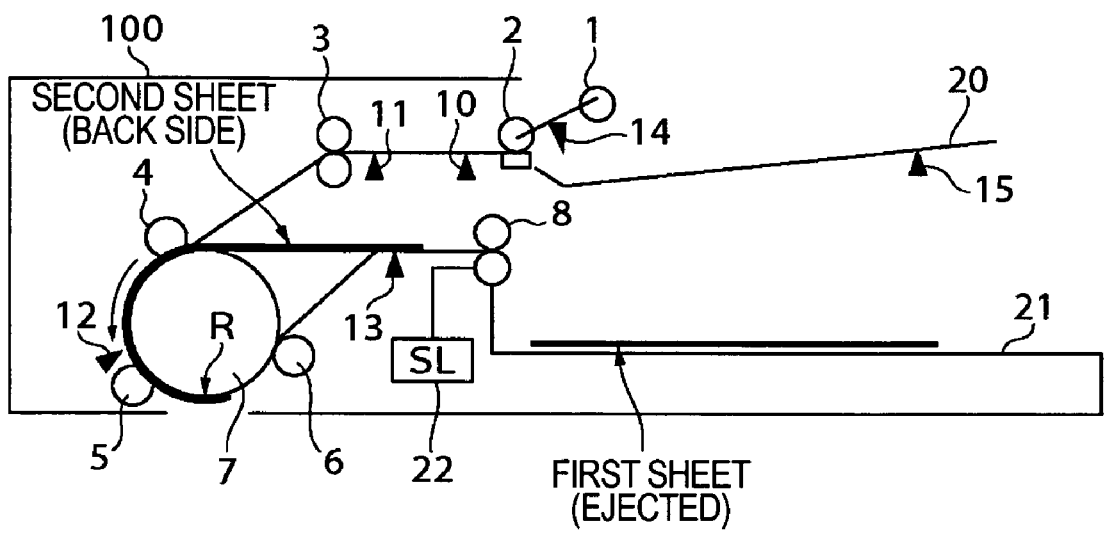
FIG. 12 is a diagram showing still yet another portion of the operation in high-speed double-side reading mode.

Then, as shown in FIG. 12, the solenoid 22 is released by the time the leading end of the first document reaches the ejection roller 8. After the trailing end of the first document passes through the reading position R, a voltage is applied to the solenoid 22 again, and the first document is ejected onto the paper ejection tray 21.

Figure 13:
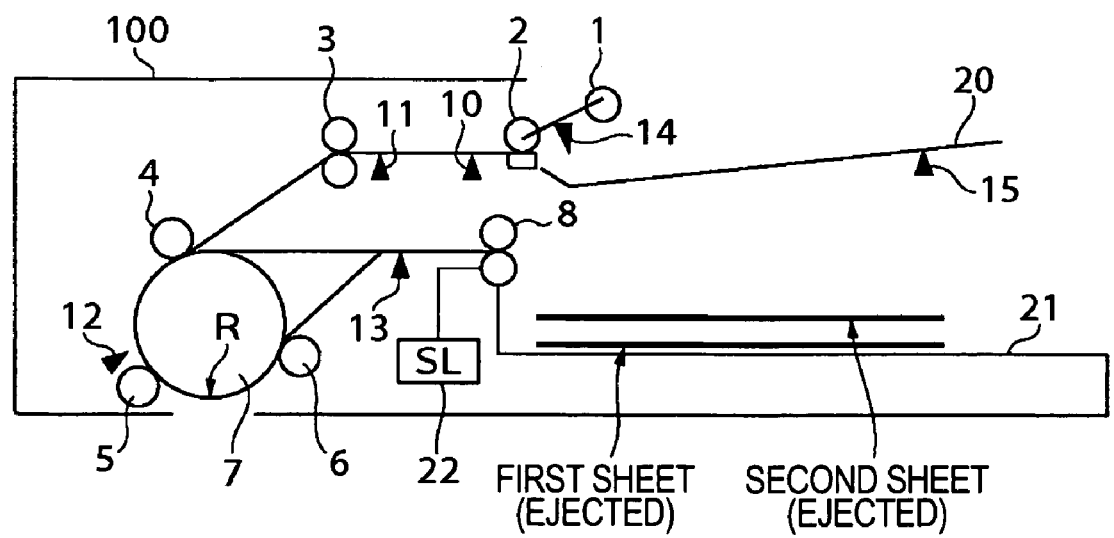
FIG. 13 is a diagram showing another portion of the operation in high-speed double-side reading mode.

Finally, as shown in FIG. 13, upon completion of the image reading on the back side of the second document, the idle transport of the second document is performed, and the second document is ejected onto the paper ejection tray 21. The operations in high-speed double-side reading mode are thus completed.

In the present embodiment, the inter-sheet correction processor 1304 of the reader 200 performs a light-distribution fluctuation correction process and dust correction process as inter-sheet correction processing.

Figure 14:
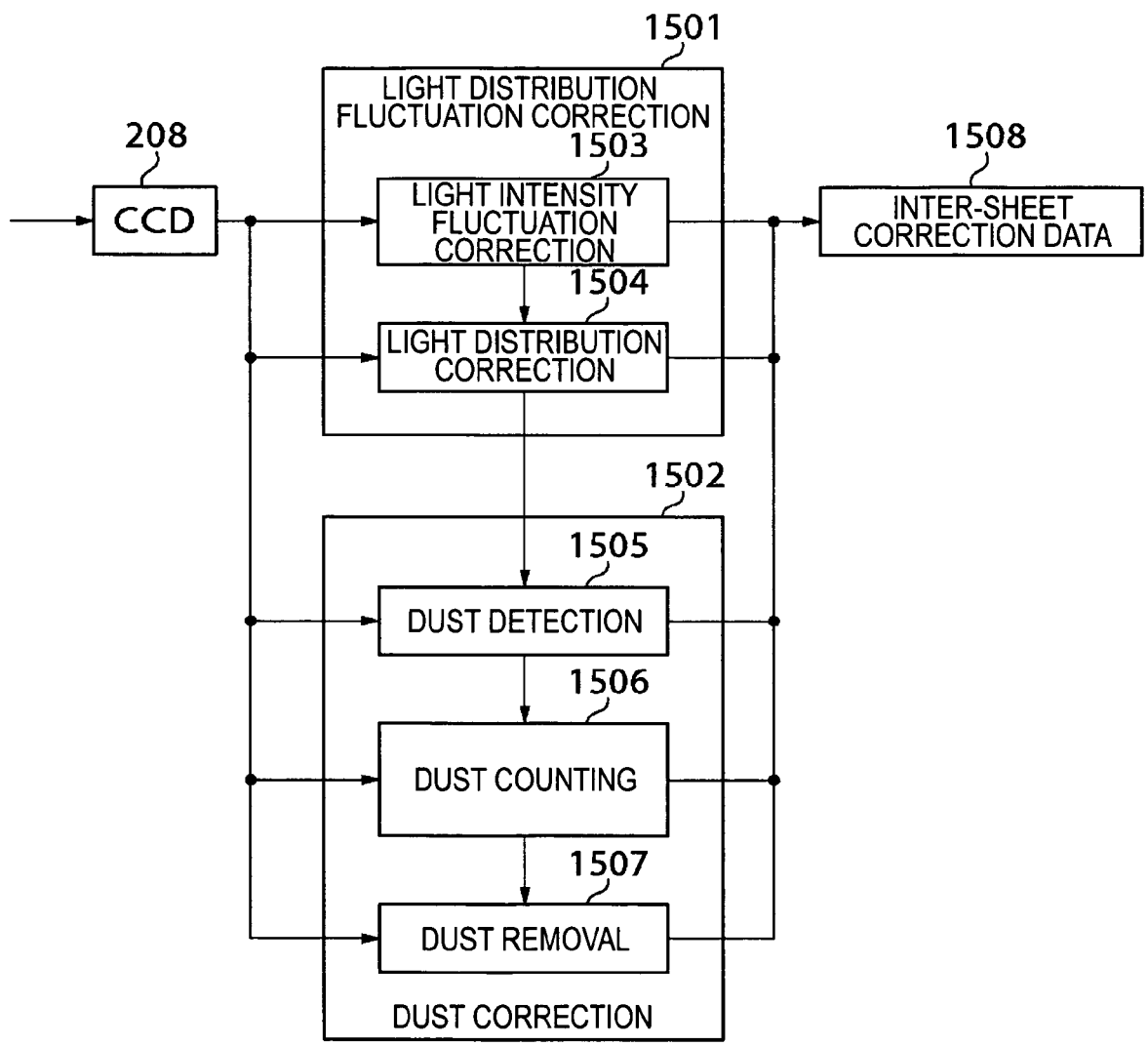
FIG. 14 is a block diagram showing a light-distribution fluctuation correction process and dust correction process in an inter-sheet correction processor of the reader.

FIG. 14 is a block diagram showing exemplary the light-distribution fluctuation correction process and the dust correction process in the inter-sheet correction processor 1304 of the reader 200. During intervals between individual documents being transported, the CCD sensor 208 reads a reference white plate at the reading position R. Inter-sheet correction processing is thus performed on the basis of the read white-level data. A light-distribution fluctuation correction process 1501 and a dust correction process 1502 that constitute the inter-sheet correction processing performed during the intervals between documents being transported will now be described.

Figure 15:
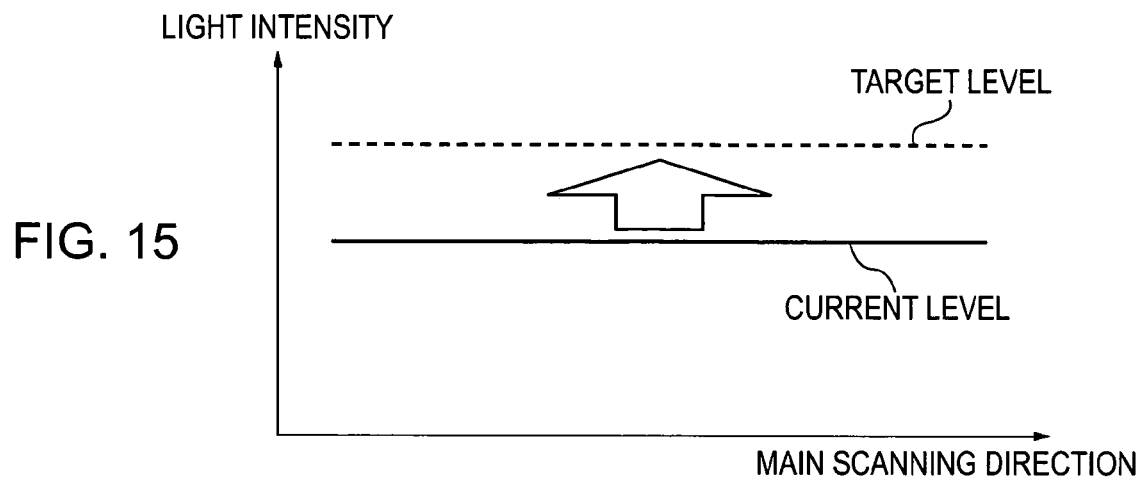
FIG. 15 is a diagram for explaining light-intensity fluctuation correction, which is an aspect of the operations of inter-sheet correction processing.
Figure 16:
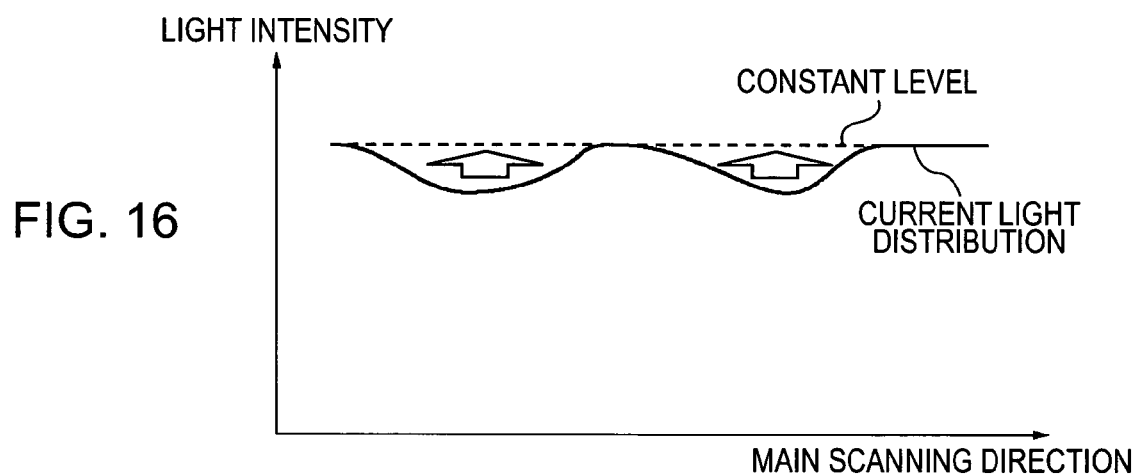
FIG. 16 is a diagram for explaining light distribution correction, which is another aspect of the operations of the inter-sheet correction processing.

The light-distribution fluctuation correction process 1501 includes light-intensity fluctuation correction 1503 in which the light intensity of the lamp 203 in the scanner unit 209 is corrected, and light distribution correction 1504 in which light distribution patterns in the main scanning direction are corrected. The light intensity of the lamp 203 gradually decreases with increasing illuminating time. Therefore, as shown in FIG. 15, the light-intensity fluctuation correction 1503 is performed to increase the overall level of light intensity of the lamp 203 from the current level to the target level. Like the light intensity, the light distribution of the lamp 203 in the main scanning direction changes with time. Therefore, as shown in FIG. 16, the light distribution correction 1504 is performed so that the light distribution in the main scanning direct is kept at the same light-intensity level (constant level).

Figure 17:
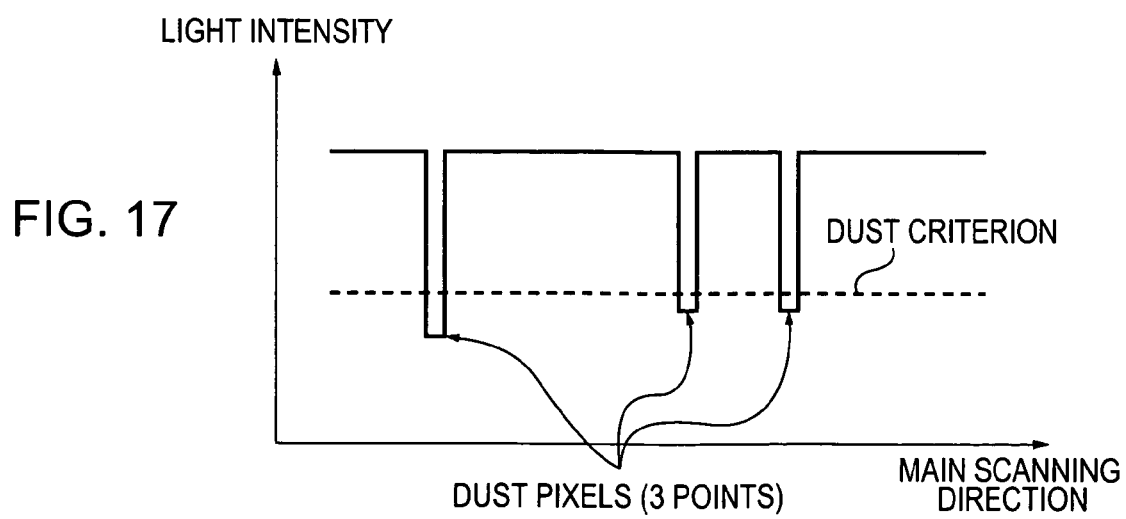
FIG. 17 is a diagram for explaining dust detection and dust counting, which is another aspect of the operations of the inter-sheet correction processing.
Figure 18A:
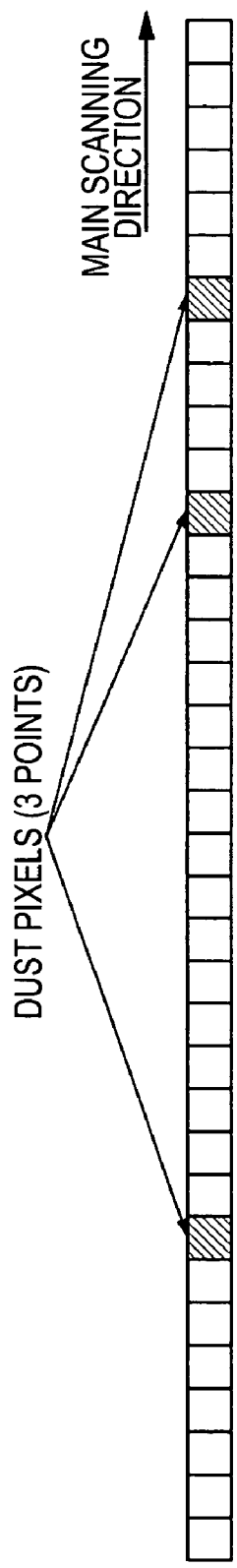
FIGS. 18A and 18B are diagrams for explaining dust removal, which is another aspect of the operations of the inter-sheet correction processing.
Figure 18B:
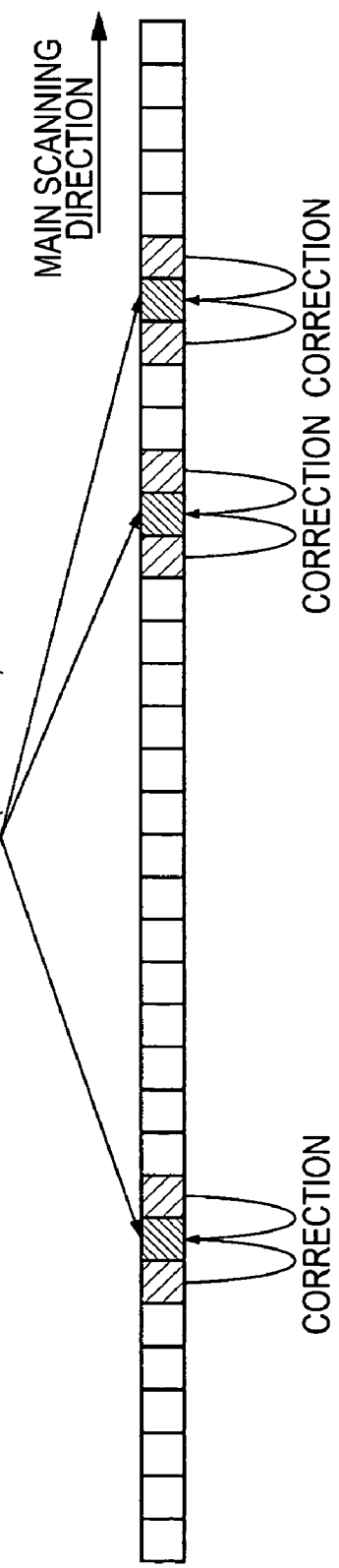

The dust correction process 1502 is the correction of dust at the reading position R, and involves dust detection 1505, dust counting 1506, and dust removal 1507. The dust detection 1505 is an operation, at the reading position R, for detecting dust present in the main scanning direction. As shown in FIG. 17, pixels below a dust criterion are detected as dust pixels. The dust counting 1506 is an operation for counting the number of dust spots detected through the dust counting 1506. In FIG. 17, dust pixels are detected at three points. As shown in FIGS. 18A and 18B, the dust removal 1507 is an operation for making dust less noticeable by interpolation of adjacent pixels.

The processing can start and end at any of the above-described operations. Each operation can create correction data upon completion. By performing the above-described correction processing in the intervals between documents, the inter-sheet correction processor 1304 creates the inter-sheet correction data 1508 and sets the inter-sheet correction data 1508 for the correction circuit 1403 in the image processor 1302 so that image reading on documents can be performed.

Next, inter-sheet correction scheduling and a method for its implementation, according to the present embodiment, will be described. To transport a document from the position of the first registration roller 3, the interval between the document and the previous document is normally calculated with reference to the registration sensor 11. The document is thus transported on the basis of this calculation.

In image reading in high-speed double-side reading mode, the calculation of the interval between the back side of the first document (n-th sheet) and the front side of the second document ((n+1)-th sheet) is performed in the same manner.

However, in FIG. 10 to FIG. 11, the interval between the completion of image reading on the front side of the second document ((n+1)-th sheet) and the arrival of the reversed first document (n-th sheet) may be shorter than normal, as the reversed first document is not transported on the basis of the calculation of the interval as described above. Since a predetermined time period required for the light-distribution fluctuation correction process and the dust correction process may not be ensured in such a case, scheduling for inter-sheet correction processing is performed as described below.

A method for calculating an inter-sheet period T that can be used as a reference for performing inter-sheet correction processing in intervals between documents will now be described.

Figures 19, 20, 21:
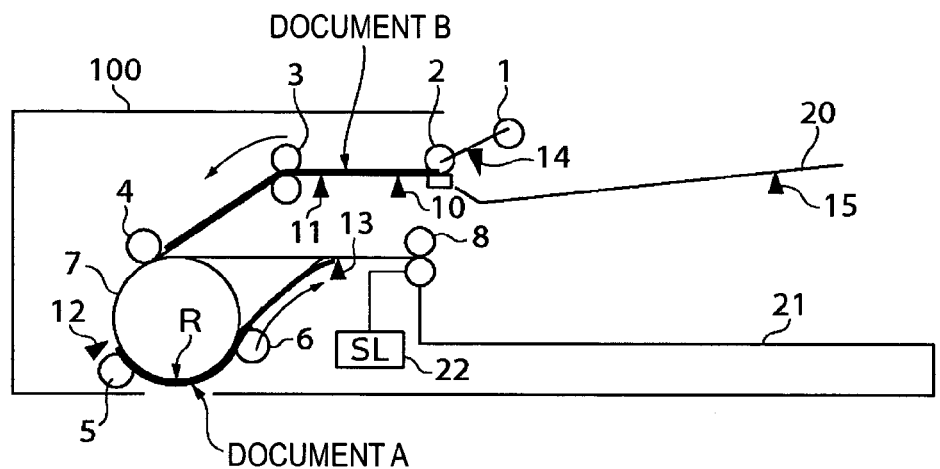
FIG. 19 is a diagram for explaining the calculation of inter-sheet periods.
FIG. 20 shows an example in which the processing of the light-distribution fluctuation correction process and dust correction process is divided into multiple steps by time period.
FIG. 21 shows an example of a schedule pattern table in which the inter-sheet correction processing is divided into steps by time period, on the basis of the minimum inter-sheet period.

FIG. 19 is a diagram for explaining the calculation of inter-sheet periods. Document A is shown currently passing through the reading position R. The read sensor 12 is turned off after detecting the passage of the document A. Time T that elapses from when the read sensor 12 is turned off to when the read sensor 12 detects the next document B and is turned on is measured. Since document A and document B are transported at the same speed in the vicinity of the reading position R, time that elapses from when the trailing end of the previous document A passes through the reading position R to when the leading end of the document B reaches the reading position R is equal to the time T described above. Therefore, inter-sheet correction is performed with reference, to the time T (hereinafter called inter-sheet period T).

The inter-sheet period T varies depending on the reading mode (single-side reading mode, normal double-side reading mode, or high-speed double-side reading mode), and depending on the reading face of the document. Therefore, the inter-sheet correction processor 1304 measures (calculates), in advance, the inter-sheet period T in adjustment mode or the like, and stores each inter-sheet period T in the inter-sheet correction processor 1304 so that each inter-sheet period T can be immediately referred to when a reading mode is set.

That is, in single-side reading mode, the inter-sheet period is always T1. In normal double-side reading mode, the inter-sheet period is T2 (front side→back side), T3 (back side→reversed document), or T4 (reversed document→front side of the next document). In high-speed double-side reading mode, the sequence of passage of documents is as follows: n-th sheet (back side)→(n+1)-th sheet (front side)→n-th sheet (reversed document)→(n+1)-th sheet (back side)→(n+2)-th sheet (front side)→(n+1)-th sheet (reversed document)→ . . . . Therefore, in high-speed double-side reading mode, the inter-sheet period is T6 (n-th sheet (back side)→(n+1)-th sheet (front side)), T7 ((n+1)-th sheet (front side)→n-th sheet (reversed document)), or T8 (n-th sheet (reversed document)→(n+1)-th sheet (back side)).

Next, as an inter-sheet correction scheduling method of the present embodiment, a method for dividing the processing of the light-distribution fluctuation correction process and dust correction process into multiple steps by time period, and a method for scheduling the sequence of the steps will be described.

FIG. 20 shows an example in which the processing of the light-distribution fluctuation correction process and dust correction process is divided into multiple steps by time period. In the present embodiment, as described above (see FIG. 14), the light-distribution fluctuation correction process is divided into the light-intensity fluctuation correction (step 1) and the light distribution correction (step 2). The dust correction process is divided into the dust detection (step 3), the dust counting (step 4), and the dust removal (step 5).

Moreover, as described above, the inter-sheet correction processor 1304 stores the inter-sheet periods for each of the reading modes (single-side reading mode, normal double-side reading mode, and high-speed double-side reading mode) therein. The inter-sheet correction processor 1304 determines the minimum inter-sheet period from the plurality of inter-sheet periods that are stored therein. The inter-sheet correction processor 1304 selects the minimum inter-sheet period from all the inter-sheet periods stored. Then, as shown in FIG. 21, the inter-sheet correction processor 1304 performs the scheduling of the steps 1 to 5 on the basis of the minimum inter-sheet period, with respect to each reading mode.

Figure 22:
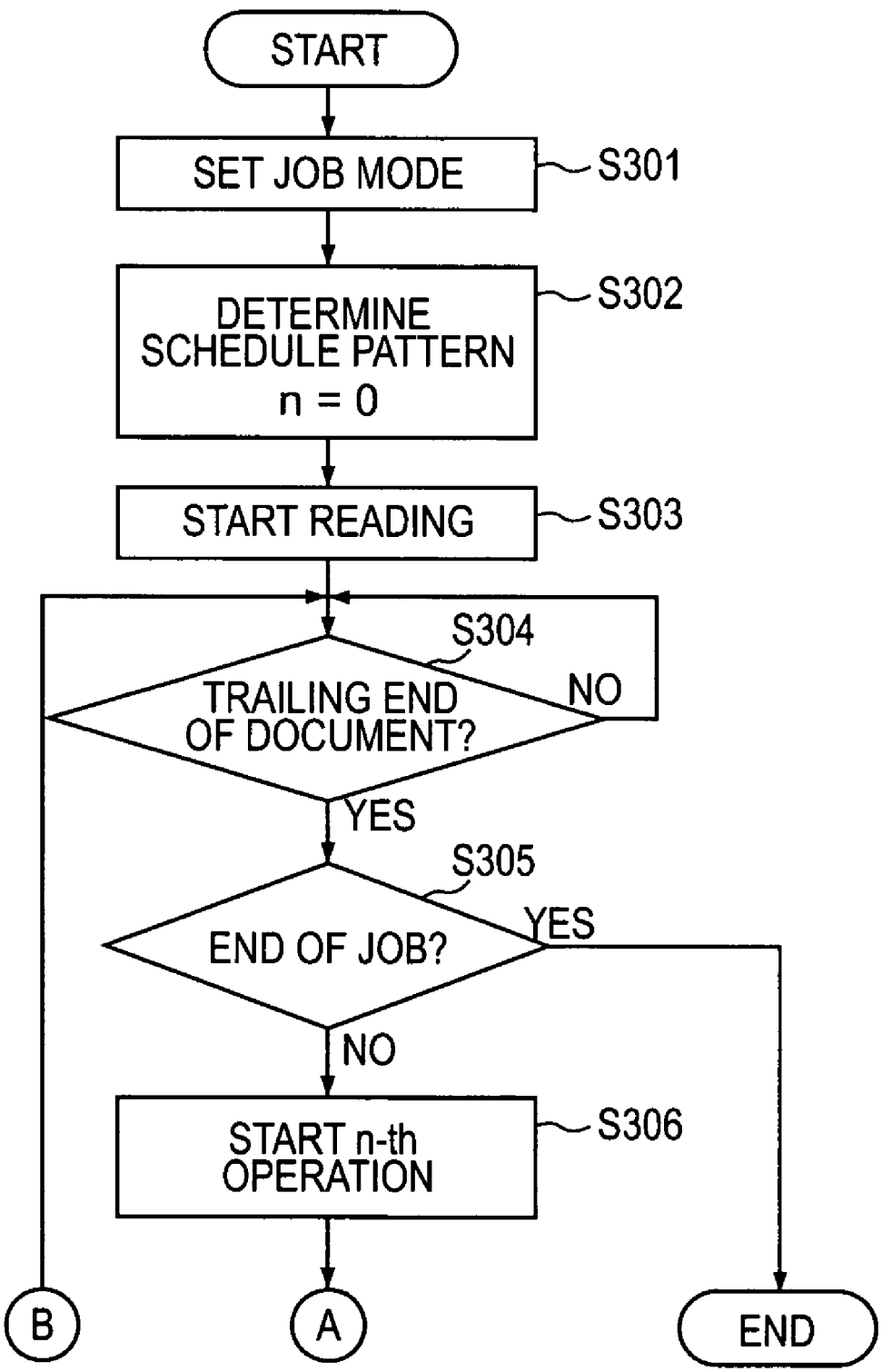
FIG. 22 is a flowchart showing an exemplary process of the inter-sheet correction processing.
Figure 23:
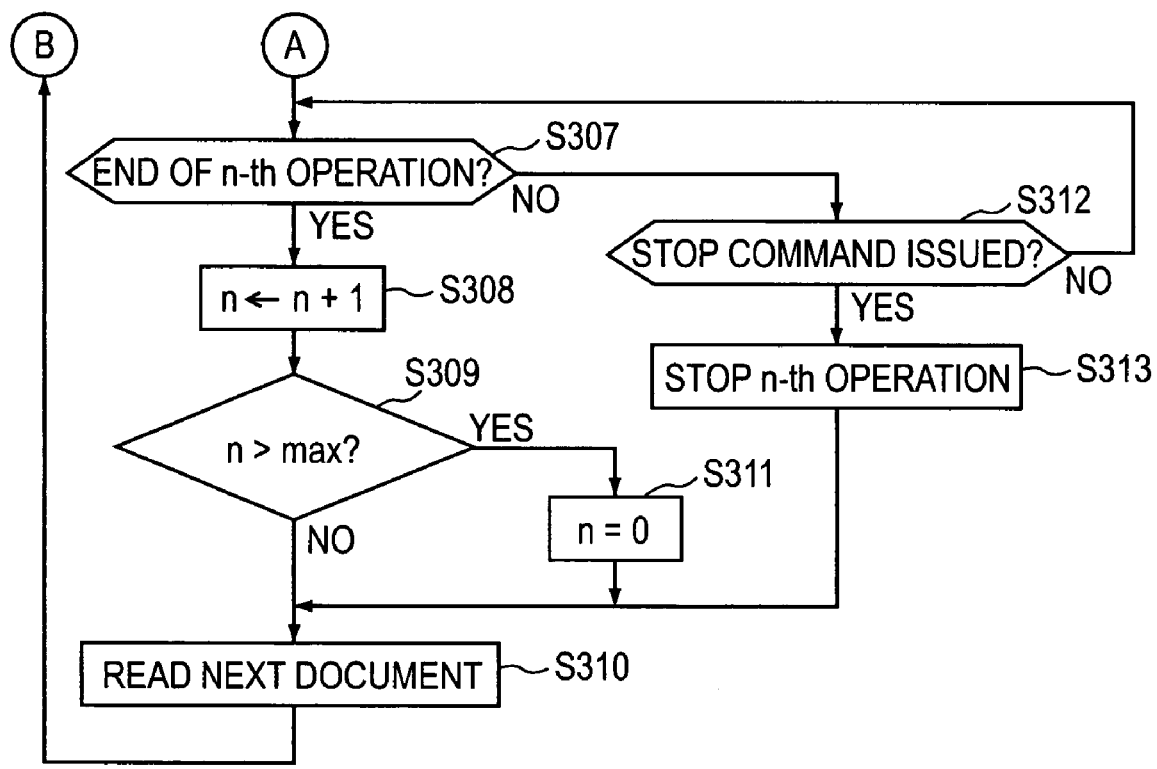
FIG. 23 is a flowchart continued from FIG. 22.

FIG. 21 shows an example of a schedule pattern table in which the inter-sheet correction processing (light-distribution fluctuation correction process and dust correction process) is divided into multiple steps on the basis of the minimum inter-sheet period. "n" (1, 2, 3, and 4) represents a correction processing unit divided by time period. That is, "n" represents a unit of correction processing to be performed during one inter-sheet period, and "max" represents the maximum number of processing steps for performing all the steps of the inter-sheet correction processing. Since the minimum inter-sheet period varies depending on the reading mode, the maximum number of correction processing units (max) also varies depending on the reading mode. The maximum numbers of correction processing units in single-side reading mode, normal double-side reading mode, and in high-speed double-side reading mode are three, two, four, respectively. The entire inter-sheet correction processing is completed by performing all the steps in every correction processing unit. Then, the inter-sheet correction processing in FIG. 22 and FIG. 23 is performed on the basis of the schedule pattern table in FIG. 21.

In single-side reading mode, where the maximum number of correction processing units is three, the steps are assigned as follows:
1. Execute steps 1 and 2 in the first correction processing unit (n=1).
2. Execute steps 3 and 4 in the second correction processing unit (n=2).
3. Execute step 5 in the third correction processing unit (n=3).

In normal double-side reading mode, where the maximum number of correction processing units is two, the steps are assigned as follows:
1. Execute steps 1 to 4 in the first correction processing unit 1 (n=1).
2. Execute step 5 in the second correction processing unit 2 (n=2).

In high-speed double-side reading mode, where the maximum number of correction processing units is four, the steps are assigned as follows:
1. Execute step 1 in the first correction processing unit 1 (n=1).
2. Execute step 2 in the second correction processing unit (n=2).
3. Execute steps 3 and 4 in the third correction processing unit (n=3).
4. Execute step 5 in the fourth correction processing unit (n=4).

FIG. 22 and FIG. 23 are flowcharts showing exemplary inter-sheet correction processing. First, the inter-sheet correction processor 1304 sets a reading mode for an image reading job selected through the operating section by a user (step S301). According to the reading mode, the inter-sheet correction processor 1304 determines a schedule pattern for the inter-sheet correction processing on the basis of the schedule pattern table in FIG. 21 (step S302). Then, the reader 200 starts reading images from a document (step S303), and the inter-sheet correction processor 1304 determines whether or not the trailing end of the document has passed through the reading position R (step S304)

If it is determined that the trailing end of the document has passed through the reading position R, the inter-sheet correction processor 1304 determines whether or not the end of the image reading job has been reached (step S305). If the end of the image reading job has not been reached, the inter-sheet correction processor 1304 starts performing the inter-sheet correction processing in the n-th correction processing unit according to the schedule pattern corresponding to the reading mode (step S306). For example, in high-speed double-side reading mode, the steps in the first to fourth correction processing units (n=1 to 4) are performed.

Then, referring to FIG. 23, the inter-sheet correction processor 1304 determines whether or not the inter-sheet correction processing in the n-th correction processing unit has been completed (step S307). If completed, the inter-sheet correction processor 1304 increments n by one (n=n+1) (step S308). Next, the inter-sheet correction processor 1304 determines whether or not n has exceeded the maximum number of correction processing units (max) (step S309). If n has exceeded the maximum number of correction processing units (max), the inter-sheet correction processor 1304 assigns zero to n in order to start over the inter-sheet correction processing (step S311). Upon completion of the inter-sheet correction processing, image reading for the next document is enabled (step S310).

On the other hand, if the inter-sheet correction processing in the n-th correction processing unit has not been completed ("NO" in step S307), the inter-sheet correction processor 1304 determines whether or not the leading end of the next document has reached the reading position R before the completion of the inter-sheet correction processing (step S312). If the read sensor 12 detects that the inter-sheet period is short and that the leading end of the next document has reached the reading position R before the completion of the inter-sheet correction processing, the inter-sheet correction processor 1304 issues a stop command. Then, the inter-sheet correction processor 1304 determines whether or not a stop command has been issued (step S312). If a stop command has not been issued, the inter-sheet correction processor 1304 continues performing the inter-sheet correction processing. On the other hand, if it is determined that a stop command has been issued, the inter-sheet correction processor 1304 stops performing the inter-sheet correction processing in the n-th correction processing unit (step S313) and starts reading images from the next document (step S310). The processing described above is repeated until the end of the image reading job.

Accordingly, with respect to the present embodiment described above, the inter-sheet correction processing is divided into steps by time period, on the basis of the inter-sheet period according to each of the reading modes (single-side reading mode, normal double-side reading mode, and high-speed double-side reading mode). Then, the scheduling of the steps in the inter-sheet correction processing is performed with respect to each reading mode. Since the inter-sheet correction processing can thus be performed even if the intervals between individual documents being transported are reduced in high-speed double-side reading mode or the like, the degradation in read images can be prevented.

Second Exemplary Embodiment

Figure 24:
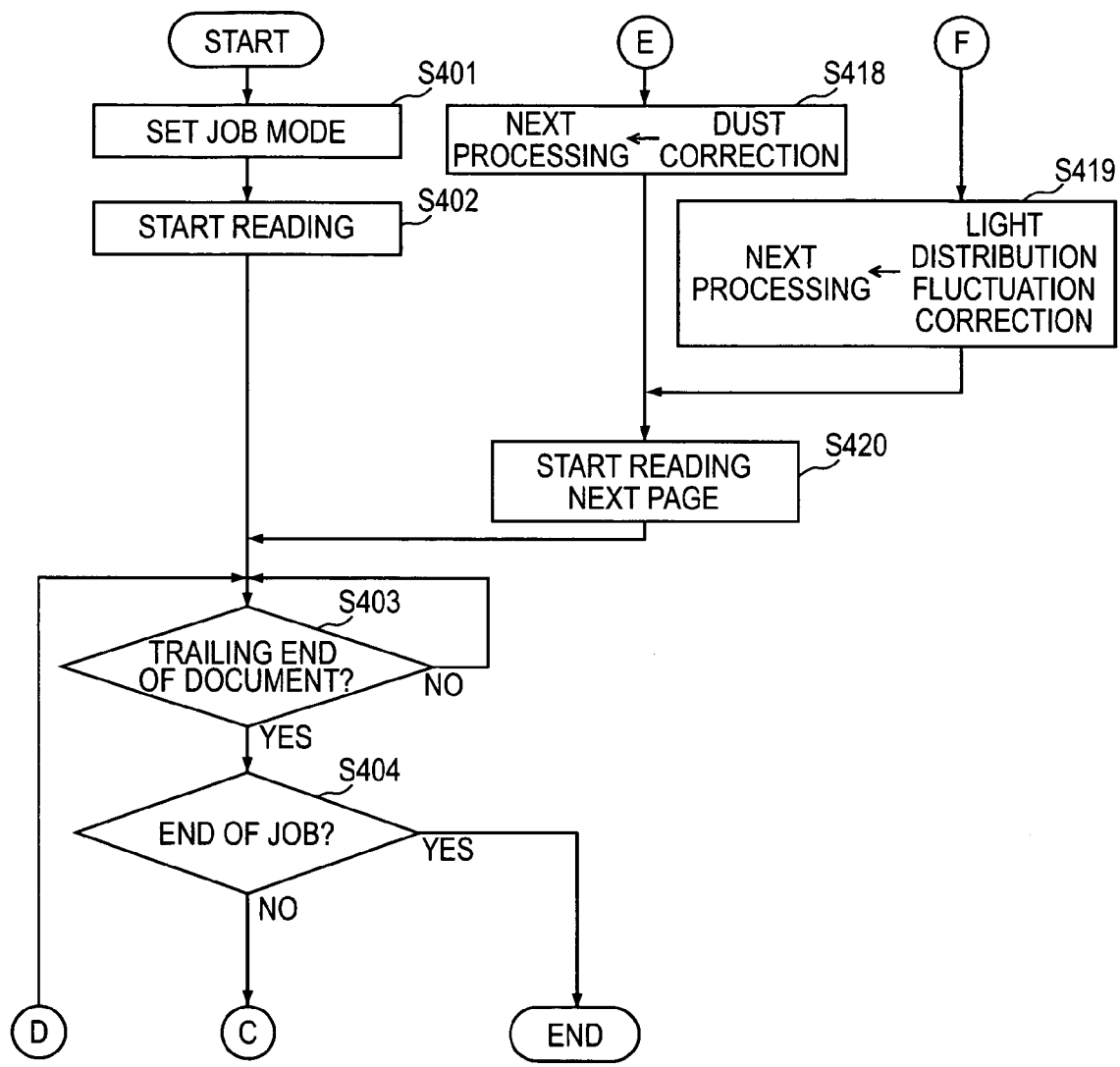
FIG. 24 is a flowchart showing an exemplary process of the inter-sheet correction processing in high-speed double-side reading mode.
Figure 25:
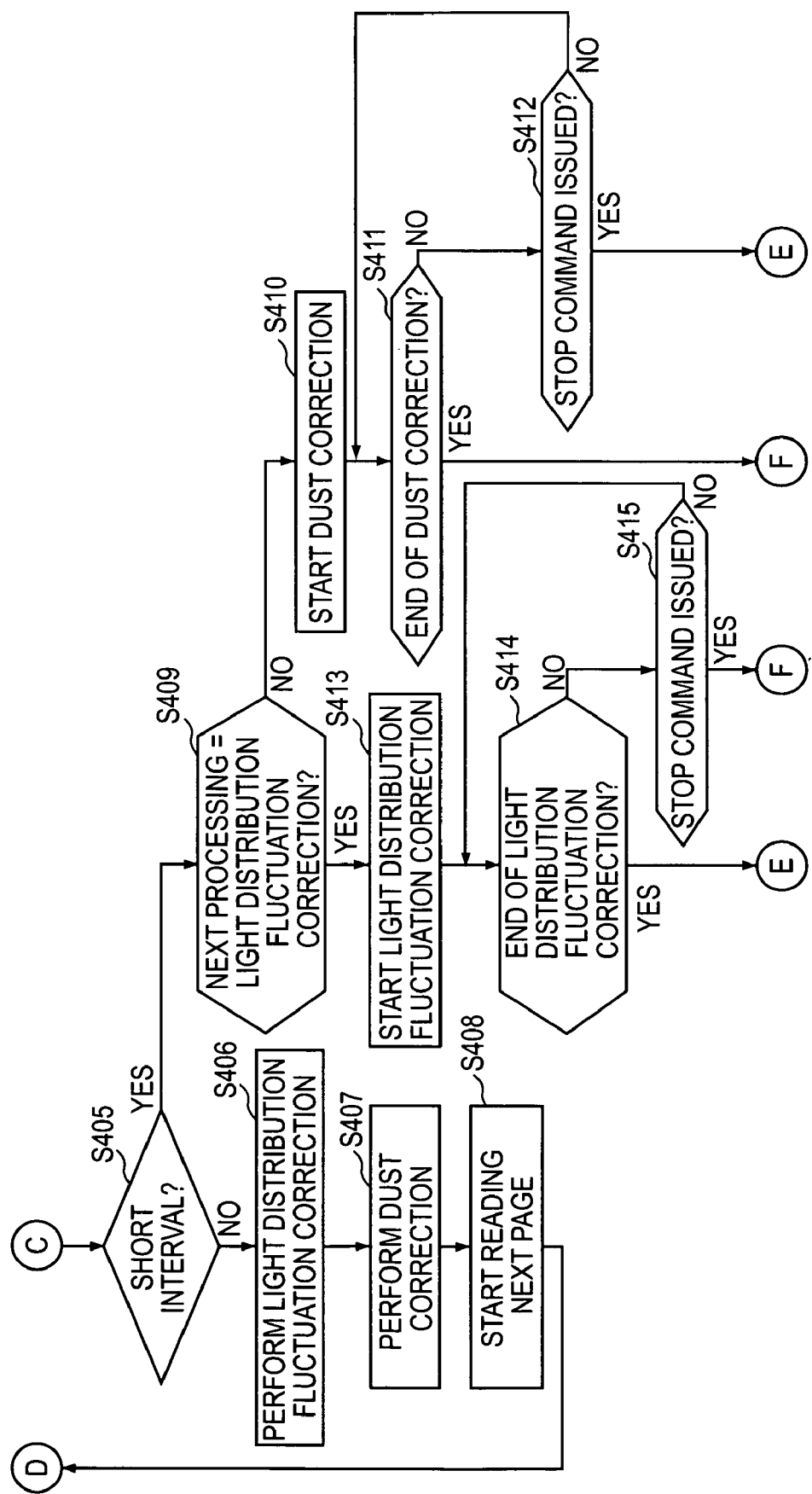
FIG. 25 is a flowchart continued from FIG. 24.

The second embodiment of the present invention differs from the first embodiment in that an inter-sheet correction scheduling method shown in FIG. 24 and FIG. 25 is executed. The other components of the present embodiment will not be described here, as they are similar to their corresponding components of the first embodiment (FIGS. 1, 3, 4 and 5).

As an inter-sheet correction scheduling method of the present embodiment, a method for scheduling the sequence of the light-distribution fluctuation correction process and dust correction process will be described.

As described above, in high-speed double-side reading mode, the interval between reading images on the back side of the n-th document and the front side of the (n+1)-th document is calculated, as normal, with reference to the registration sensor 11. However, as described above, the interval between the completion of image reading on the front side of the (n+1)-th document and the arrival of the reversed n-th document may be shorter than normal. In the high-speed double-side reading mode, documents are transported in the order as follows: n-th sheet (back side)→(n+1)-th sheet (front side)→n-th sheet (reversed document)→(n+1)-th sheet (back side)→(n+2)-th sheet (front side)→(n+1)-th sheet (reversed document)→ . . . . Therefore, determination as to whether or not the period until the arrival of the next document will be short can be made by observing the sequence of documents passing through the reading position R. If the interval is short, the light-distribution fluctuation correction process or the dust correction process is sequentially performed.

FIG. 24 and FIG. 25 are flowcharts showing exemplary inter-sheet correction processing in high-speed double-side reading mode. First, the inter-sheet correction processor 1304 sets the high-speed double-side reading mode as a reading mode for an image reading job selected through the operating section by the user. The inter-sheet correction processor 1304 sets the light-distribution fluctuation correction process as default processing to be performed when the intervals between individual documents transported by the ADF 100 is short (step S401). Then the reader 200 starts reading images from a document (step S402), and the inter-sheet correction processor 1304 determines whether or not the trailing end of the document has passed through the reading position R (step S403). If it is determined that the trailing end of the document has passed through the reading position R, the inter-sheet correction processor 1304 determines whether or not the end of the image reading job has been reached (step S404).

Referring to FIG. 5, if the end of the image reading job has not been reached (if the next document is present), the inter-sheet correction processor 1304 determines whether or not the inter-sheet period for performing the inter-sheet correction processing is short (step S405). As described above, this can be determined on the basis of the reading mode and by observing the sequence of documents passing through the reading position R.

If the length of the inter-sheet period is normal, the inter-sheet correction processor 1304 performs the light-distribution fluctuation correction process and the dust correction process (step S406 and step S407) and starts reading images on the next document (page) (step S408). If the inter-sheet period is short, the inter-sheet correction processor 1304 determines which of the light-distribution fluctuation correction process and the dust correction process is to be performed as the next processing (step S409). If the next processing is the light-distribution fluctuation correction process (if the light-distribution fluctuation correction process is set as the default processing), the inter-sheet correction processor 1304 starts performing the light-distribution fluctuation correction process (step S413).

Then, the inter-sheet correction processor 1304 determines whether or not the light-distribution fluctuation correction process has been completed (step S414). If the read sensor 12 detects that the inter-sheet period is short and that the leading end of the next document has reached the reading position R before the completion of the light-distribution fluctuation correction process, the inter-sheet correction processor 1304 issues a stop command. If the light-distribution fluctuation correction process has not been completed, the inter-sheet correction processor 1304 determines whether or not a stop command has been issued (step S415).

Referring back to FIG. 24, if a stop command has been issued, the inter-sheet correction processor 1304 stops the light-distribution fluctuation correction process and sets light-distribution fluctuation correction process as the next processing (step S419). On the other hand, if a stop command has not been issued, the inter-sheet correction processor 1304 waits for the completion of the light-distribution fluctuation correction process and sets dust correction process as the next processing (step S418).

Referring back to FIG. 25, if on the other hand, the next processing is dust correction process ("NO" in step S409), the inter-sheet correction processor 1304 starts performing the dust correction process (step S410). Then, the inter-sheet correction processor 1304 determines whether or not the dust correction process has been completed (step S411). If the inter-sheet period is short and the leading end of the next document has reached the reading position R before the completion of the dust correction process, the inter-sheet correction processor 1304 issues a stop command. Then, the inter-sheet correction processor 1304 determines whether or not a stop command has been issued (step S412).

Now referring back to FIG. 24, if a stop command has been issued (step S415), the inter-sheet correction processor 1304 stops performing the dust correction process and sets dust correction process as the next processing (step S418). On the other hand, if a stop command has not been issued, the inter-sheet correction processor 1304 waits for the completion of the dust correction process and sets light-distribution fluctuation correction process as the next processing (step S419). Then, the inter-sheet correction processor 1304 starts reading images on the next document (page) (step S420). The processing described above is repeated until the end of the image reading job.

Accordingly, in the present embodiment described above, even if the interval between reading images from individual documents is reduced in high-speed double-side reading mode, the inter-sheet correction processing is performed as much as possible by scheduling it. This prevents degradation in the quality of images read from the next document.

Other Exemplary Embodiments

The image reading apparatus of the first and second embodiments has a structure in which the ADF and the reader are separate. The present invention is not only applicable to image reading apparatuses having the structure described above, but also applicable to image reading apparatuses that integrate an ADF with a reader.

While the image reading apparatus is described in the first and second embodiments, the present invention is not only applicable to the image reading apparatus described above, but also applicable to image forming apparatuses (e.g. copier, multi-function machine, and facsimile machine) that incorporate the image reading apparatus.

Moreover, the present invention is achieved by supplying, to a system or apparatus, a storage medium (recording medium) on which a software program code for performing the functions of the above-described embodiments is recorded. In other words, the present invention is achieved when a computer (CPU or micro-processing unit (MPU)) in the system or apparatus reads and executes the program code stored in the storage medium.

In this case, the program read out of the storage medium performs the functions of the above-described embodiments, and thus the storage medium on which the program code is recorded constitutes the present invention.

In addition to the case where the functions of the above-described embodiments are performed when the computer reads and executes the program code, there are other cases where the functions of the above-described embodiments are performed. For example, on the basis of instructions of the program code, an operating system (OS) running on the computer carries out all or a part of the actual processing, which allows the functions of the above-described embodiments to be performed.

The functions of the above-described embodiments are also performed when the program code read out of the storage medium is written in a function expansion card in a computer, or in a memory of a function expansion unit connected to a computer. For example, after the program code is written, the function expansion card or a CPU in the function expansion unit carries out, on the basis of instructions of the program code, all or a part of the actual processing, which allows the functions of the above-described embodiments to be performed.

The program code described above may take any form that allows a computer to perform the embodiments of the present invention. Examples of such a form include an object code, a program to be executed by an interpreter, and script data to be supplied to an OS.

A recording medium for supplying the program code may take any form that allows the program code to be stored thereon. Examples of such a recording medium include a random-access memory (RAM), a nonvolatile RAM (NV-RAM), a floppy (registered trademark) disk, an optical disk, a magneto-optical (MO) disk, a compact-disk read-only memory (CD-ROM), a CD-recordable (CD-R), a CD-rewritable (CD-RW), a digital versatile disk (DVD) (e.g. a DVD-ROM, a DVD-RAM, a DVD-RW, and a DVD+RW), a magnetic tape, a nonvolatile memory card, and other types of ROMs. Alternatively, the above-described program code may be downloaded from a computer or database (not shown) connected to the Internet, a commercial network, or to a local area network (LAN).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-332373 filed Nov. 16, 2004, which is hereby incorporated by reference herein in its entirety.

What is claimed is:

1. An image reading apparatus configured to allow a reading device fixed at a reading position to read images from a document while transporting the document, the apparatus comprising:

a correcting unit adapted to perform correction processing associated with image reading performed by the reading device;

a calculating unit adapted to calculate a time interval from one document to another document that is being transported;

a scheduling unit adapted to divide the correction processing into a plurality of steps and schedule the execution of the steps on the basis of the time interval calculated by the calculating unit; and an executing unit adapted to sequentially execute the steps scheduled by the scheduling unit every time a document passes through the reading position.

2. The image reading apparatus according to claim 1, wherein there are a plurality of reading modes, including, a single-side reading mode in which one side of a document is read;

a normal double-side reading mode in which both sides of a document are read; and a high-speed double-side reading mode in which, after the back side of a first document is read, the front side of the subsequent document is read simultaneously with the reverse ejection of the first document.

3. The image reading apparatus according to claim 1, wherein the correction processing to be performed is selected from a group of operations including, an operation for correcting fluctuations in the intensity of light illuminating a document;

an operation for correcting light distribution;

an operation for detecting dust at the reading position, an operation for counting the number of dust spots; and an operation for correcting pixels in which dust has been detected.

4. The image reading apparatus according to claim 1, further comprising a detecting unit adapted to detect that a document has passed through the reading position, wherein the executing unit, during the execution of the steps scheduled by the scheduling unit, stops executing the steps when the detecting unit detects that the leading end of the subsequent document has passed through the reading position.

5. The image reading apparatus according to claim 2, wherein the scheduling unit assigns the steps to time units that can fall within time intervals between documents transported during reading in the reading modes; and creates a schedule table for each of the plurality of reading modes such that all the steps are executed within an arbitrary number of time intervals between documents on the basis of the time intervals between documents transported during reading in the reading modes and on the basis of time required for the execution of the steps.

6. The image reading apparatus according to claim 2, wherein the executing unit executes, according to a sequence scheduled by the scheduling unit, executable operations of the correction processing when a time interval between documents during reading in the high-speed double-side reading mode is short.

7. The image reading apparatus according to claim 1 further comprising a setting unit adapted to set a reading mode, wherein the calculating unit calculates a time interval between documents according to a reading mode set by the setting unit.

8. An image reading and forming apparatus configured to allow a reading device fixed at a reading position to read images from a document while transporting the document, the apparatus comprising:

a correcting unit adapted to perform correction processing associated with image reading performed by the reading device;

a calculating unit adapted to calculate a time interval from one document to another document that is being transported;

a scheduling unit adapted to divide the correction processing into a plurality of steps and schedule the execution of the steps on the basis of the time interval calculated by the calculating unit;

an executing unit adapted to sequentially execute the steps scheduled by the scheduling unit every time a document passes through the reading position; and an image forming unit adapted to form an image on a sheet on a basis of images read by the image reading apparatus.

9. A control method for an image forming apparatus allowing a reading device fixed at a reading position to read images from a document while transporting the document, the control method comprising:

performing correction processing associated with image reading performed by the reading device;

calculating a time interval from one document to the next document that are being transported during reading in a selected reading mode;

dividing the correction processing into a plurality of steps and scheduling the execution of the steps on the basis of the time interval calculated by the calculating step; and sequentially executing the steps scheduled by the scheduling step every time a document passes through the reading position.

10. A computer readable medium containing computer-executable instructions for an image forming apparatus allowing a reading device fixed at a reading position to read images from a document while transporting the document, the computer readable medium comprising:

computer-executable instructions for performing correction processing associated with image reading performed by the reading device;

computer-executable instructions for calculating a time interval from one document to the next document that are being transported during reading in a selected reading mode;

computer-executable instructions for dividing the correction processing into a plurality of steps and scheduling the execution of the steps on the basis of the time interval calculated by the calculating step; and computer-executable instructions for sequentially executing the steps scheduled by the scheduling step every time a document passes through the reading position.

11. An image reading apparatus adapted to allow a reading unit fixed at a reading position to read images from a document while transporting the document, the apparatus comprising:

a correcting device configured to perform correction processing associated with image reading performed by the reading unit;

a calculating device configured to calculate a time interval from a first document to a next document that is being transported;

a scheduling device configured to divide the correction processing into a plurality of steps and schedule the execution of the steps on the basis of the time interval calculated by the calculating device; and an executing device configured to sequentially execute the steps scheduled by the scheduling device every time a document passes through the reading position.

* * * * *